April 26, 1932.  C. A. SCHACHT  1,855,314
PORTABLE DRY AND LIQUID FEEDER
Filed May 17, 1929   2 Sheets-Sheet 1

INVENTOR.
Clifford A. Schacht
BY
ATTORNEYS

April 26, 1932.  C. A. SCHACHT  1,855,314
PORTABLE DRY AND LIQUID FEEDER
Filed May 17, 1929   2 Sheets-Sheet 2

INVENTOR.
Clifford A. Schacht
BY Alexander Bell
ATTORNEYS

Patented Apr. 26, 1932                                                      1,855,314

UNITED STATES PATENT OFFICE

CLIFFORD A. SCHACHT, OF HUNTINGTON, INDIANA

PORTABLE DRY AND LIQUID FEEDER

Application filed May 17, 1929. Serial No. 363,772.

This invention is a novel portable dry and liquid feeder for young live-stock such as calves, etc., and the principal objects of the invention are to provide a sanitary portable feeder for calves and other young live-stock, designed to prevent waste of feed, also designed for cleanliness, and for saving labor in handling the young live-stock. Heretofore it has been the usual practice to hold the pail in the hand while the calf or the like drinks; or the pail has heretofore been nailed or otherwise retained in a box in the manger, a practice which is obviously unsanitary; and in feeding small calves from a bucket held in the hand, or even if the bucket is placed on the ground, the calves eventually destroy the bucket. In using my novel feeder the bucket containing the liquid feed is merely dropped into the portable feeder and the dry feed is also put in the feed box beside the bucket. Another feature of my feeder is the extension skids on the bottoms of the feeder legs, which extensions are made sufficiently wide so that the calves can not tip the feeder over, thereby making this feeder practical; also the provision of novel spikes for anchoring the skids to the ground, where and if necessary.

Another feature in the use of my feeder is that the liquid holding bucket may be placed in the feeder from one side while the calves are eating the dry feed from the other side of the feeder.

Other minor objects of the invention will be hereinafter set forth.

I will explain the invention with reference to the accompanying drawings which illustrate practical embodiments thereof to enable others to adopt and use the same; and will summarize in the claims the novel features of construction, and novel combinations of parts, for which protection is desired.

Figure 1:
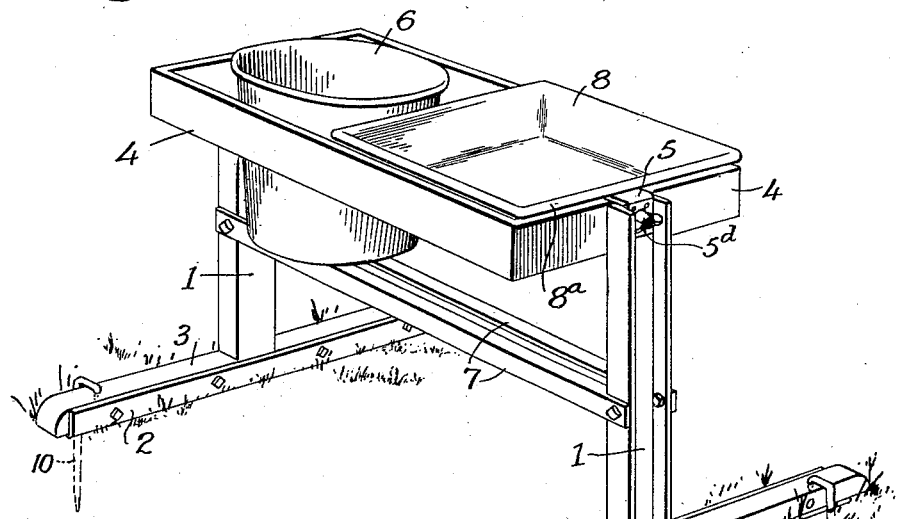
Fig. 1 is a perspective view of one form of the feeder.
Figure 2:
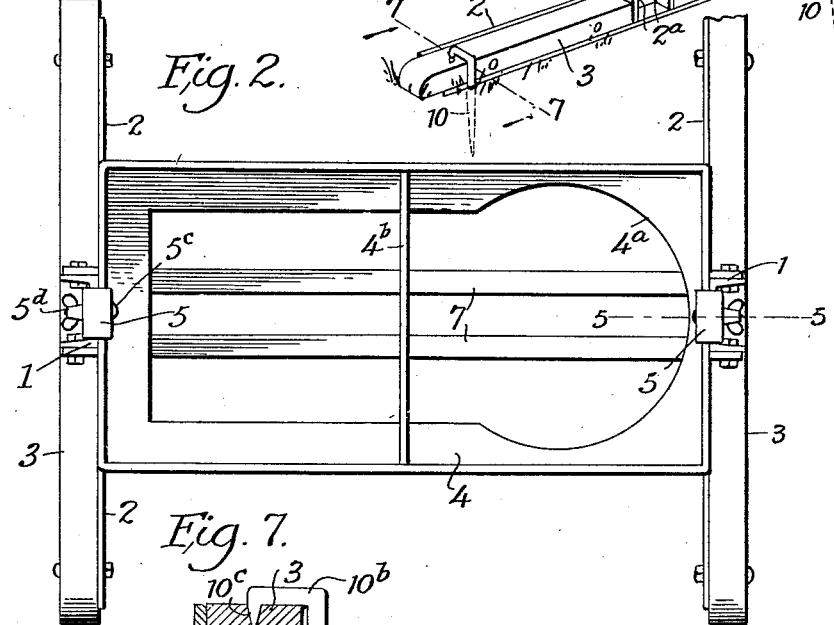
Fig. 2 is a top plan view of the feeder shown in Fig. 1, with the pail and tray removed.

As shown the feeder comprises a pair of spaced uprights 1, preferably channel bars, opposed back to back, having skids 2 of extra length secured to the bottoms of bars 1 to keep the feeder from being readily tipped over by the live-stock. Preferably the skids 2 are made of angle irons having their vertical legs bolted as at 2a or otherwise secured to the backs of the channel bars 1 with the horizontal legs of the angle irons 2 underlying the lower ends of legs of the channel bars 1; and preferably wooden blocks 3, bolted in the bosoms of the angle iron skids 2 are provided to protect the live-stock from injury from the corners of the skids while feeding. Skids 2 extend a relatively great distance from each side of uprights 1, and may be anchored to the ground by spikes 10 (Figs. 1 and 7) or the like if necessary.

Figure 5:
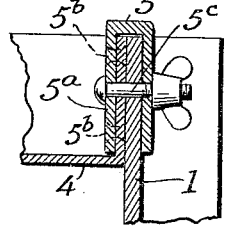
Fig. 5 is a section on the line 5—5 of Fig. 2.

Extending between the upper ends of uprights 1 (Figs. 1, 2, 3 and 5) is a tray frame 4 preferably rectangular in plan, and made of angle irons having their corners welded together. Tray frame 4 is secured at its ends to the uprights 1 by means of U-shaped metallic clips 5 (Fig. 5) said clips being inverted and straddling the abutting ends of the uprights and the frame 4, one leg 5a of each clip 5 being secured to the end of the tray frame 4 by countersunk rivets 5b (Fig. 5) and bolts 5c provided with wing nuts 5d transfix both legs of each clip 5 and the embraced ends of the frame 4 and upright 1 to secure the tray 4 to the uprights. If bolts 5c were removed the clips 5 would still hold the tray 4 in place owing to the length of the legs of the clips, and to the fact that they extend the full width of the channels 1 between the legs thereof, thereby preventing the tray 4 from pivoting on the uprights. If desired, the clips 5 could be rigidly secured to the upper ends of the uprights 1 instead of to the ends of tray 4, this construction being just the reverse of that shown in Fig. 5, but this arrangement would necessitate the use of the wing bolts 5c at all times.

Figure 6:
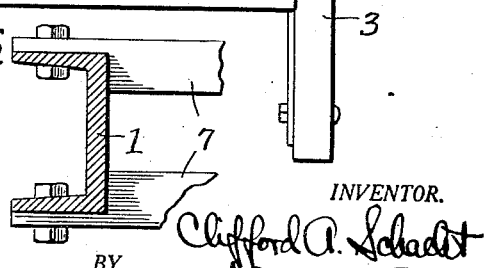
Fig. 6 is a section on the line 6—6 Fig. 3.

The inner edge of the bottom flanges of the frame 4 at one end are cut in a circular shape as at 4a (Fig. 2) to receive a pail or bucket 6 forming the liquid holder of the feeder, which bucket is removably inserted down into the frame and rests upon braces 7 of angle iron connecting the uprights 1 below the frame 4. These braces 7 are preferably small angle irons each having one leg disposed parallel with the frame 4 and the other leg extending downwardly and bolted to the side legs of the channel bars 1 as shown in Fig. 6.

A cross bar 4b connects the sides of the frame 4 adjacent the periphery of the pail or bucket 6. Within the frame 4 at the side of cross bar 4b opposite from the bucket 6 is a removable metallic dry feed pan 8 (Figs. 1 and 3) of rectangular shape having a rolled rim 8a and its sides slightly tapered so that the pan can be easily placed in or removed from the frame for cleaning purposes.

Figure 4:
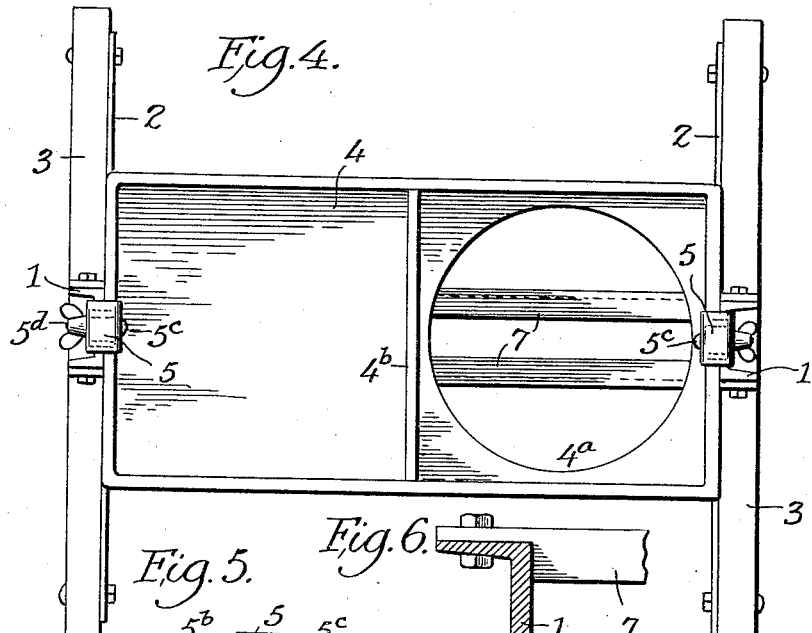
Fig. 4 is a top plan view of a modified form, with the liquid holding pail removed.

Fig. 4 shows a modification of the feeder in which the removable pan 8 is omitted, the frame 4 itself forming the pan for the dry feed. In this modification the frame 4 is preferably made of wood instead of angle iron, and the bottom of the frame is covered except for the circular opening 4a through which the pail 6 is inserted in the same manner as above set forth. The cross bar 4b between the sides of the tray serves as the end of the dry feed compartment, pail 6 being the only removable part. In this modification the edges of the dry feed compartment should be beveled or rounded in order to remove all sharp corners.

Figure 7:
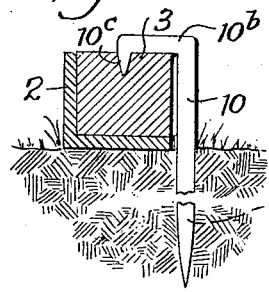
Fig. 7 is a section on the line 7—7 Fig. 1 showing the spike for anchoring the feeder skids to the ground.
Figure 3:
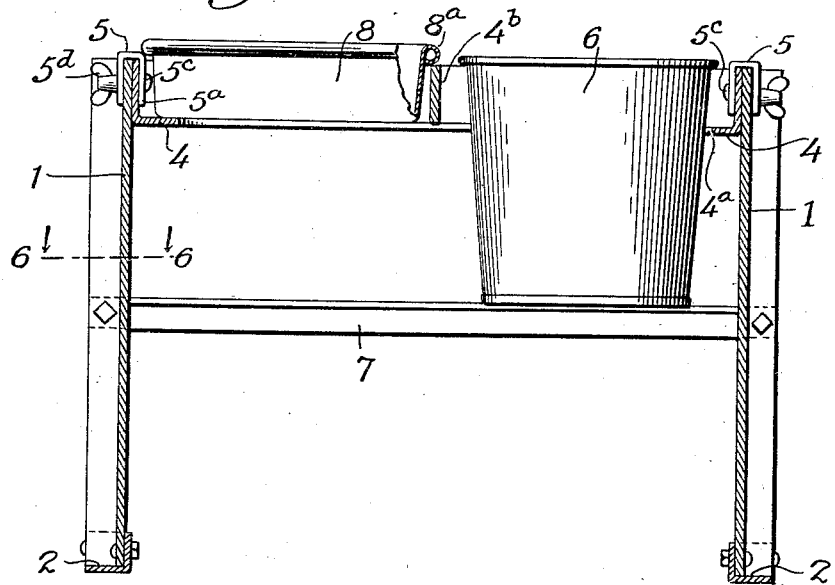
Fig. 3 is a longitudinal section through the feeder shown in Fig. 1.

Means may be provided if necessary for anchoring the feeder to the ground when the feeder is to be used in a field. As shown in Figure 7 this means comprises a spike 10 having a long pointed shank 10a adapted to be driven into the ground, the shank being provided with a head 10b, the lower end of which is pointed as at 10c and adapted to be driven into the wooden fillers 3 in the bosoms of the angle iron skids 2. When so driven the skids 2 will be sufficiently anchored to the ground to prevent overturning of the feeder by the live-stock.

The above described feeder is designed to prevent waste feed, and is designed for cleanliness, and for saving time and labor in handling live-stock, obviating the necessity of holding the pail in the hand while the calf drinks from the pail. While we have described the uprights, skids, braces, etc. as being preferably made of metal the same could be readily made of wood, particularly when the feeder is to be used in a covered barn or stable; but if used in the open, as in a field, a metal frame would be preferable as the metal would not be apt to warp and deteriorate.

The extension skids 2 prevent the feeder from being readily tipped over. The dry feed tray 8 can be removable for cleaning purposes as in Fig. 1, or stationary as in Fig. 4; and obviously other ways of emptying and cleaning the dry feed pan or compartment could be utilized; for instance, the bottom of the tray could be hinged so as to drop down, or the pan could be made similar to a drawer so that it could be pulled out and cleaned.

I do not limit my invention to the exact forms shown in the drawings, for obviously changes could be made therein within the scope of the claims.

I claim:

1. A dry and liquid stock feeder, comprising a pair of spaced uprights; a tray removably secured to the upper ends of said uprights, said tray having a partition; a brace extending between the uprights below the tray; and said tray having an opening at one side of the partition; to receive a pail removably inserted through the opening and resting upon the said brace.

2. In a feeder as set forth in claim 1; said uprights comprising channel bars; and inverted U-shaped clips embracing the ends of the tray and the uprights, one leg of each clip being secured to one of the embraced members; and bolts removably transfixing the legs of the clips and the embraced members.

3. A dry and liquid stock feeder comprising a pair of spaced uprights, elongated skids at the bases of said uprights, a tray removably secured to the upper ends of said uprights, said tray having a partition; a brace extending between the uprights below the tray; and said tray having an opening at one side of the partition to receive a pail removably inserted through the opening and resting upon the said brace.

4. In a feeder as set forth in claim 3; said uprights comprising channel bars; and inverted U-shaped clips embracing the ends of the tray and the abutting portions of the uprights, one leg of each clip being secured to one of the embraced members; and bolts removably transfixing the legs of the clips and the embraced members.

5. In a dry and liquid stock feeder comprising a pair of spaced channel bars; a tray extending between the upper ends of said uprights; inverted U-shaped clips embracing the ends of the tray and the abutting portions of the uprights, one leg of each clip being secured to the end of the tray and the other leg fitting between the legs of the channel bars; bolts removably transfixing the legs of the clips and the embraced members; said tray having a partition and having an opening at one side of the partition; to receive a pail removably inserted through the circular opening and a brace extending between the uprights below the tray.

6. A dry and liquid stock feeder comprising a pair of spaced uprights, elongated skids at the bases of said uprights, said skids comprising angle bars with protecting blocks secured in the bosoms of the bars; a tray removably secured to the upper ends of said uprights, said tray having a partition and having an opening at one side of the partition to receive a pail removably inserted through the opening; and a brace extending between the uprights below and parallel with the tray.

7. In a feeder as set forth in claim 6, said uprights comprising channel bars; and inverted U-shaped clips embracing the ends of the tray and the abutting portions of the uprights, one leg of each clip being secured to one of the embraced members, and bolts removably transfixing the legs of the clips and the embraced members; the clips extending between and abutting the legs of the channel bars for the purpose specified.

CLIFFORD A. SCHACHT.